United States Patent
Dong et al.

(10) Patent No.: US 9,122,353 B2
(45) Date of Patent: Sep. 1, 2015

(54) KIND OF MULTI-TOUCH INPUT DEVICE

(71) Applicant: International Business Machines Corporation, Armonk, NY (US)

(72) Inventors: Jin Dong, Beijing (CN); Yu Hui Fu, Beijing (CN); Qi Ming Tian, Beijing (CN); Ming Xie, Beijing (CN); Wen Jun Yin, Beijing (CN); Wei Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 13/706,761

(22) Filed: Dec. 6, 2012

(65) Prior Publication Data
US 2013/0155026 A1    Jun. 20, 2013

(30) Foreign Application Priority Data
Dec. 16, 2011    (CN) .......................... 2011 1 0423250

(51) Int. Cl.
*G06F 3/042* (2006.01)
*G06F 3/01* (2006.01)

(52) U.S. Cl.
CPC .............. *G06F 3/0425* (2013.01); *G06F 3/011* (2013.01); *G06F 3/013* (2013.01)

(58) Field of Classification Search
CPC ........ G06F 3/011; G06F 3/013; G06F 3/0425
USPC ............ 345/136, 156–184; 178/18.01–18.09, 178/19.01–19.04, 20.01
See application file for complete search history.

(56) References Cited

U.S. PATENT DOCUMENTS

| | | | |
|---|---|---|---|
| 2009/0109180 A1* | 4/2009 | Do et al. ........................ | 345/173 |
| 2009/0315740 A1* | 12/2009 | Hildreth et al. .................. | 341/20 |

FOREIGN PATENT DOCUMENTS

WO    2011136783 A1    11/2011

OTHER PUBLICATIONS

Huang, et al., TouchAble: a camera-based multitouch system. Sen Sys '10 Proceedings of the 8th ACM Conference on Embedded Networked Sensor Systems, ISBN:978-1-4503-0344-6, pp. 405, 406. Publisher: ACM New York, NY, USA copyright 2010.

(Continued)

*Primary Examiner* — Kumar Patel
*Assistant Examiner* — Insa Sadio
(74) *Attorney, Agent, or Firm* — Cantor Colburn LLP

(57) ABSTRACT

A multi-touch method includes, in response to at least one finger of a user pointing toward a computer screen, recognizing an eye and at least one finger in an image frame taken by a camera; mapping a first coordinate of the recognized finger in the image frame to a second coordinate of the finger on the computer screen; mapping a third coordinate the recognized eye in the image frame to a fourth coordinate of the eye on the computer screen; determining whether the fourth coordinate is in the proximity of the second coordinate; in response to a positive decision, determining the second coordinate as a multi-touch point.

11 Claims, 4 Drawing Sheets

(56) References Cited

OTHER PUBLICATIONS

Wensheng, et al., Fingertip tracking and multi-point gensture recognition. 2010 International Symposium on Intelligent Signal Processing and Communications systems, 4 pp., 2010; ISBN-13: 978-1-4244-7369-4; Publisher IEEE, Piscataway, NJ, USA.

Wilson, Robust Computer Vision-Based Detections of Pinching for One and Two-Handed Gesture Input. Proceeding UIST '06 Proceedings of the 19th Annual ACM Symposium on User Interface Software and Technology, ISBN: 1-59593-313-1, pp. 255-258. Publisher ACM New York, NY, USA copyright 2006.

* cited by examiner

KIND OF MULTI-TOUCH INPUT DEVICE

PRIORITY

This application claims priority to Chinese Patent Application No. 201110423250.2, filed 16 Dec. 2011, and all the benefits accruing therefrom under 35 U.S.C. §119, the contents of which in its entirety are herein incorporated by reference.

BACKGROUND

The present invention relates to multi-touch technology, and more specifically, to a multi-touch method and apparatus for general-purpose computers, and a portable terminal device.

The multi-touch technique is a technique allowing computer users to control graphic interfaces with multiple fingers simultaneously. With the prevalence of multi-touch capable smart phones, gesture recognition based on multi-touch control has gradually become a widely accepted human-machine interaction technique.

Multi-touch input must rely on multi-touch control devices, generally, multi-touch pads or touch screens supporting multi-touch input. However, such devices are not very popular nowadays, which commonly only present in high-end electronic devices, such as notebook computers, or need to be purchased separately. Many home or commercial desktop computers and notebook computers do not support multi-touch in terms of hardware, thus the applications of multi-touch input technology on general purpose computers are limited.

In order to develop and apply software systems supporting multi-touch input in the absence of multi-touch devices, many techniques of multi-touch input simulation have been developed. For example, a multi-touch input simulation software covers the window of target software which supports multi-touch input, and one or several points are clicked with a mouse device on the target software as fixed input points, then a moveable input pointer is simulated with the mouse device. It has also been done to simulate two input points by two mouse devices. The number of touch points that can be simulated by such method is very limited, with a huge difference between this input manner and that of multi-touch input operations, and an unfavorable effect.

Gesture recognition based on machine vision has emerged recently, in which gestures are captured with a camera, and interaction semantics of gestures are determined through calculating correlation coefficients between motion traces of gestures and predetermined templates. Existing methods of recognizing fingers and simulating multiple touches through a camera require a physical surface with checkerboard lattices as a simulated touch pad. Images of motions of fingers are taken by a camera supporting wireless communication, and then transmitted to a computer through wireless communication for analysis. Multi-touch inputs of users are acquired through camera auto-calibration, pose learning before using, image recognition in use, and the like methods.

However, such camera-based gesture recognition requires additional accessory devices, such as a physical surface with checkerboard lattices, a wireless camera added for capturing finger movements, an embedded transmission device, and connection to a computer through a USB wireless receiver. However, these requirements apparently limit the applications of such technique. In addition, such methods are unable to solve problems about the start and termination of inputs favorably. When fingers are present in images, users may possibly have not prepared to start or withdrawn fingers after their operations. It may cause a great inconvenience to the operations of users if it is unable to accurately distinguish the start and termination of inputs, or even lead to operation confusion, losing its practical value as a result.

Therefore, there is a need for a multi-touch technique applicable for general purpose computers, capable of overcoming defects in the prior art, which, on common personal computers and on the premise of without additional hardware devices, can support multi-touch input of users in a simple and natural manner as approximate as possible to that of practical multi-touch device operations.

SUMMARY

In view of the above problems, a multi-touch method and apparatus is provided.

According to a first aspect, a multi-touch method includes, in response to at least one finger of a user pointing toward a computer screen, recognizing an eye and at least one finger in an image frame taken by a camera; mapping a first coordinate of the recognized finger in the image frame to a second coordinate of the finger on the computer screen; mapping a third coordinate the recognized eye in the image frame to a fourth coordinate of the eye on the computer screen; determining whether the fourth coordinate is in the proximity of the second coordinate; in response to a positive decision, determining the second coordinate as a multi-touch point.

According to a second aspect, a multi-touch apparatus includes a recognition module configured to, in response to at least one finger of a user pointing toward a computer screen, recognize an eye and at least one finger in an image frame taken by a camera; a coordinate mapping module configured to map a first coordinate of the recognized finger in the image frame to a second coordinate of the finger on the computer screen; map a third coordinate of the recognized eye in the image frame to a fourth coordinate of the eye on the computer screen; a determination module configured to determine whether the fourth coordinate is in the proximity of the second coordinate; a multi-touch point determination module configured to, in response to a positive decision, determine the second coordinate as a multi-touch point.

According to a third aspect of this invention, a portable terminal device comprising the above multi-touch apparatus is provided.

The multi-touch method and apparatus according to embodiments of this invention can, on the premise of without additional hardware devices, support multi-touch input of users in a simple and natural manner as approximate as possible to that of practical multi-touch device operations.

BRIEF DESCRIPTION OF THE SEVERAL VIEWS OF THE DRAWINGS

In conjunction with accompanying drawings, through reference to the method and apparatus described in detail in the following embodiments, this invention itself, preferable embodiments, objects and advantages of this invention will be better understood, in which.

DETAILED DESCRIPTION

Objects and advantages of this invention will be better understood from the following description of a multi-touch method and apparatus given with reference to accompanying drawings.

Figure 1:
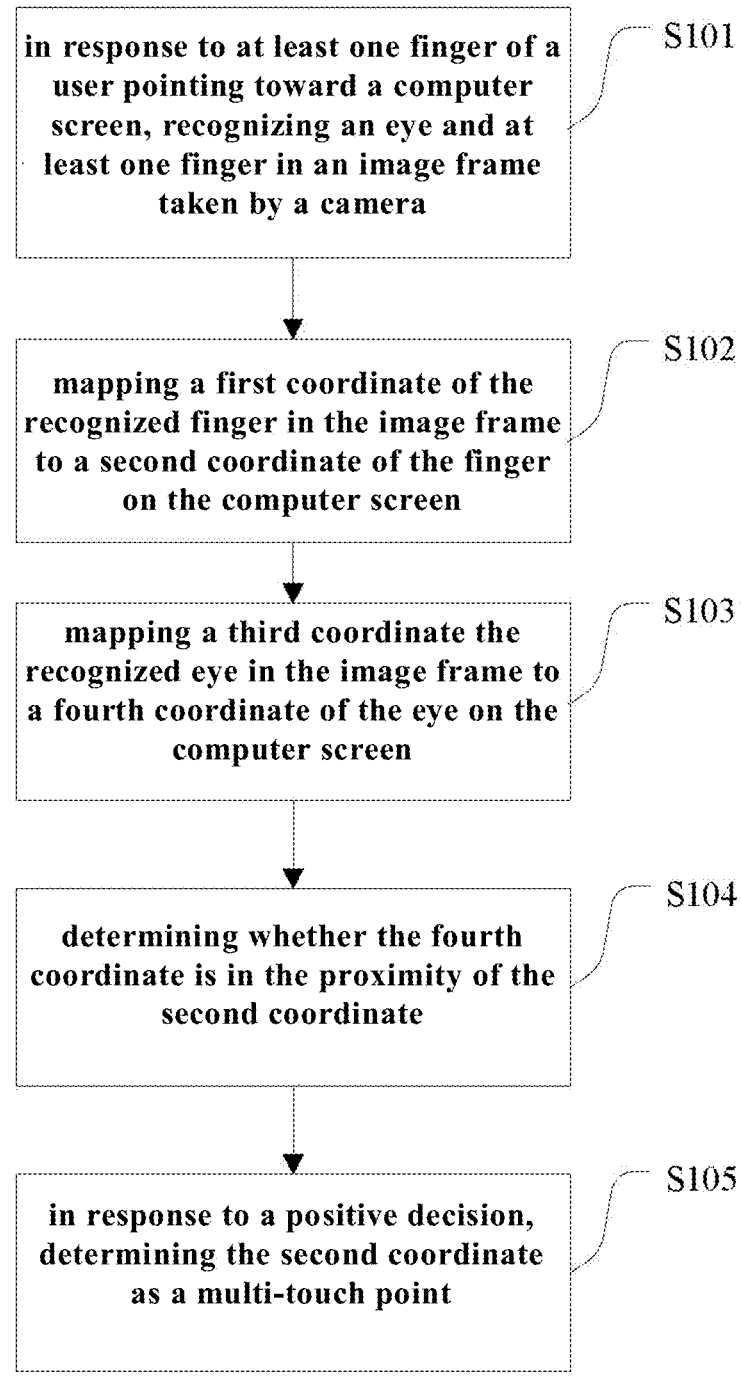
FIG. 1 shows a multi-touch method according to embodiments of the invention.

FIG. 1 shows a multi-touch method according to embodiments of this invention. At block S101, in response to at least one finger of a user pointing toward a computer screen, an eye and at least one finger in an image frame taken by a camera is recognized; at block S102, a first coordinate of the recognized finger in the image frame is mapped to a second coordinate of the finger on the computer screen; at block S103, a third coordinate of the recognized eye in the image frame is mapped to a fourth coordinate of the eye on the computer screen; at block S104, it is determined whether the fourth coordinate is in the proximity of the second coordinate; at block S105, in response to a positive decision, the second coordinate is determined as a multi-touch point.

Specifically, at block S101, in response to at least one finger of a user pointing toward a computer screen, an eye and at least one finger in an image frame taken by a camera is recognized. Cameras have become a standard configuration of general purpose computers or notebook computers for collecting user images in their scopes of visual field in real time. When a user stretches out at least one finger pointing toward a computer screen, a camera collects images in its shooting scope in real time, and the system recognizes an eye and at least one finger in an image frame taken by the camera. In order to recognize the eye and finger from an image more effectively, it is necessary to learn features from a large number of finger and eye images. Taking the similarity of fingers and eyes of different peoples into account, the system employs an offline method to learn finger and eye features, in which sampled finger and eye images are selected as positive samples and arbitrary images are selected as negative samples, a classifier is trained with the positive and negative samples, with the following specific operations:

(1) finding out several users (e.g., about 50 persons) representative of finger and eye image features of a user group;

(2) for each user, taking a set of images for each of his fingers and eyes with different distances from a camera, and different guises;

(3) artificially labeling fingers and eyes in those images with rectangular blocks;

(4) normalizing those rectangular block images to a selected typical size according to a scale as positive samples;

(5) randomly selecting various kinds of images, particularly, indoor images when considering that this system is mainly used in indoor scenarios, arbitrarily extracting square image blocks from those images, which are then normalized to form negative samples;

(6) training a classifier with the positive and negative samples, such as a SVM classifier or a ANN classifier;

Because finger and eye images have relatively significant features and strong consistency, according to the current technical level, classifiers can successfully recognize whether an arbitrary rectangular image is a finger image or an eye image after training. In subsequent steps, a classifier will be used to determine (analyze and locate) a finger or eye area in an image.

A finger and eye in an image frame collected by a camera can be recognized through the following three operations:

1. image pre-processing

Pixels in the collected image frame are processed, primarily, image gray scale processing, as a foundation of image partition, feature extraction and selection.

2. image partition first, the collected image frame is partitioned into multiple image sub-blocks according to the size of the rectangular image block of the classifier, then finger and eye recognition is performed on all of these image sub-blocks by the classifier, which will analysis geometrical shapes and pixel distributions in multiple image sub-blocks, and also compare the multiple image sub-blocks in the collected image frame to the sampled finger and eye images by which the classifier has been trained one by one, to find matched image sub-blocks according to similarity, so as to find finger or eye contained image sub-blocks, while recording the positions of those image sub-blocks in the image frame. Threshold segmentation is performed on an obtained eye or finger image, for example, images of the eyeball portion and its surrounding portion have significant features, that is, an eyeball image has pixel values approximating to 0 (eyeball) or 255 (the white of the eye), by which threshold segmentation can be performed. Boundaries of the recognized finger and eyeball are extracted with an image boundary detection and extraction algorithm, and the boundary detection and extraction process is also a process of acquiring original data for image feature calculation.

3. image feature selection and extraction

Figure 2:
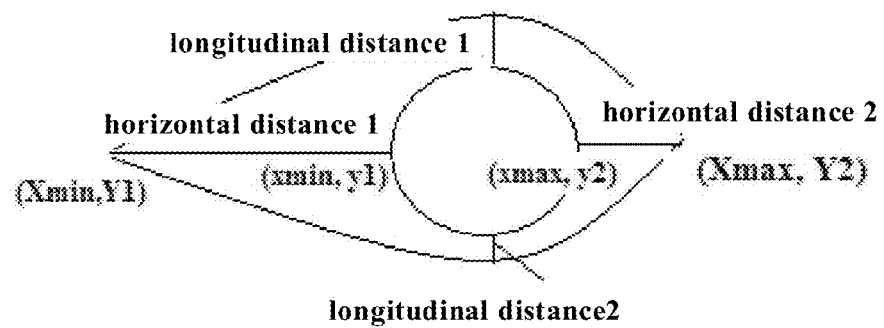
FIG. 2 shows a schematic diagram of the coordinate of an eye in an image frame.

According to the number and coordinates of pixels on the eyeball boundary, the coordinates for an eyeball image are calculated. FIG. 2 shows a schematic diagram showing the coordinate of an eye in an image frame. The central position coordinates $(X_t, Y_t)$ of the eyeball are used to represent the coordinates of the eye image, wherein the central position coordinates $(X_t, Y_t)$ of the eyeball are:

$$X_t = \frac{\sum_{i \in target\_area\_boundary} x_i}{\text{the\_number\_of\_pixels\_on\_eyeball\_boundary}: n} \quad (1)$$

$$Y_t = \frac{\sum_{i \in target\_area\_boundary} y_i}{\text{the\_number\_of\_pixels\_on\_eyeball\_boundary}: n}$$

wherein:

$x_i$ denotes the x coordinate of a eyeball boundary point;

$y_i$ denotes the y coordinate of a eyeball boundary point;

$$\text{the horizontal distance } 1 = \sqrt{(X\min - x\min)^2 + (Y1 - y1)^2} \quad (2)$$

$$\text{the horizontal distance } 2 = \sqrt{(X\max - x\max)^2 + (Y2 - y2)^2} \quad (3)$$

wherein:

(X min, Y1) denoes a pixel on the orbit boundary having a minimal x coordinate;

(x min, y1) denotes a pixel on the eyeball boundary having a minimal x coordinate;

(X min, Y2) denotes a pixel on the orbit boundary having a maximal x coordinate;

(x max, y2) denotes a pixel on the eyeball boundary having a maximal x coordinate.

Figure 3:
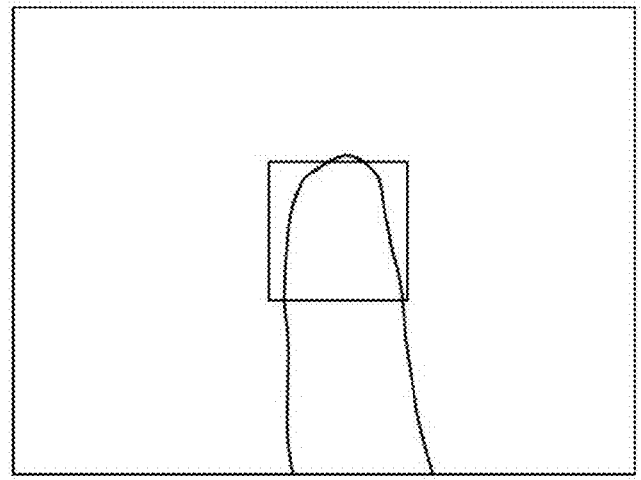
FIG. 3 shows a schematic diagram of an image of a finger.

FIG. 3 shows a schematic diagram of a finger, wherein the finger boundary is represented by a rectangular block. The coordinates of the finger image are calculated according to the number and coordinates of pixels on the finger boundary. The coordinates of the finger image are represented by the central position coordinate $(X_m, Y_m)$ of the finger image.

$$X_m = \frac{\sum_{i \in target\_area\_boundary} x_i}{the\_number\_of\_pixels\_on\_finger\_boundary: n} \quad (4)$$

$$Y_m = \frac{\sum_{i \in target\_area\_boundary} y_i}{the\_number\_of\_pixels\_on\_finger\_boundary: n}$$

The area of the finger image region is represented by the number of pixels with the following formula:

$$A = \sum_{(x,y) \in R} 1 \quad (5)$$

Wherein A is the number of pixels contained in that region, that is, the area of that region, R is the region within the finger image boundary.

Figure 4:
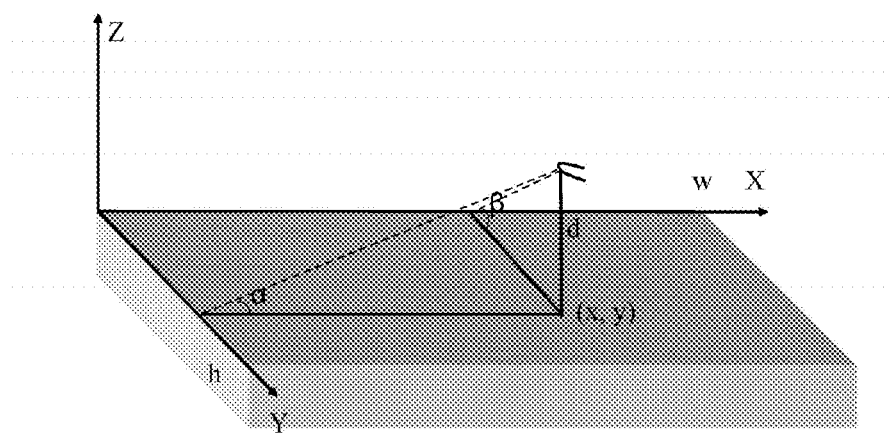
FIG. 4 shows a schematic diagram of a finger in a three-dimensional coordinate system having a computer screen as its X-Y plane.

At block S102, a first coordinate of the finger recognized in the image frame is mapped to a second coordinate of the finger on the computer screen. Specifically, FIG. 4 shows a schematic diagram of a finger in a three-dimensional coordinate system having the computer screen as its X-Y plane. First, a three-dimensional coordinate system is set, with the upper left corner of the screen as its original point; the right direction along the screen as the positive direction of the X axis, the downward direction along the screen as the positive direction of the Y axis, the X and Y axes overlapping with the screen plane; the direction vertical to the screen plane as the Z axis and the direction facing upward as its positive direction.

Before the first time of use, users need to calibrate the relationship between a finger image area A and a distance d from the screen, that is, a ratio coefficient n=A/d. In front of a computer, a user stretches out a finger A pointing toward the screen, a central position coordinate $(X_m, Y_m)$ of the finger in an image is acquired according to the image recognition result of block S101, then the recognized central position coordinate of the finger in the image is mapped to a coordinate on the screen. Commonly, cameras are provided on the top middle of the screens of notebook computers, and image visual fields of different notebook computers only have ignorable differences in their relative position relationships with the finger. According to the horizontal and longitudinal coordinate position of the finger in the image frame, setting the height and width of the image frame as h and w, an angle α and an angle β between the finger and the screen plane in the X direction and the Y direction can be obtained.

$$\alpha = 90 - \arctan(Y_m - h/2)/d \quad (6)$$

$$\beta = 90 - \arctan(X_m - w/2)/d \quad (7)$$

Further, a coordinate B (X,Y) on the computer screen mapped from the finger A is calculated:

$$X = d/\tan \alpha, Y = d/\tan \beta \quad (8)$$

Figure 5:
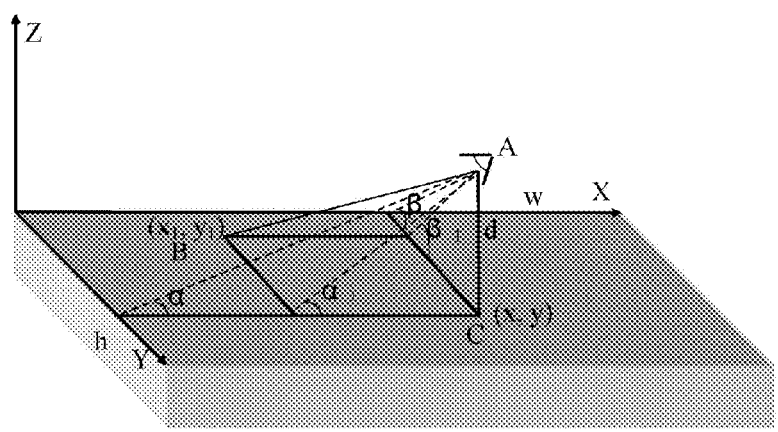
FIG. 5 shows a schematic diagram of an eye in a three-dimensional coordinate system having a computer screen as its X-Y plane.

At block 5103, a third coordinate of a recognized eye in an image frame is mapped to a fourth coordinate of the eye on the computer screen. FIG. 5 shows a schematic diagram of an eye in a three-dimensional coordinate system having a computer screen as its X-Y plane, wherein the fourth coordinate of the eye on the computer screen is calculated based on the following parameters: a third coordinate of the eye in the image frame, the size of the eye α, a relationship coefficient n between the size α of the eye and a distance d between the eye and the computer screen, and the orientation of the pupil of the eye in the spatial coordinate system. According to an embodiment of this invention, the fourth coordinate of the eye on the computer screen can be calculated using a single eye (a left or right eye) or two eyes. First, a three-dimensional coordinate system is set, with the upper left corner of the screen as its original point; the right direction along the screen as the positive direction of the X axis, the downward direction along the screen as the positive direction of the Y axis, the X and Y axes overlapping with the screen plane; the direction vertical to the screen plane as the Z axis and the direction facing upward as its positive direction. Before the first time of use, users need to calibrate the relationship between an eye area α and a distance d between the eye and the screen, that is, a ratio coefficient n=α/d. In front of a computer, a user stares at a certain position on the screen, according to the position of the eye in an image at that time, the orientation of the pupil of the eye in the spatial coordinate system, and a position at which the user clicked, a unique unknown quantity n can be deduced according to the present algorithm. Other methods are also possible, for example, the user can directly input a distance d between the eye and the camera, and then n is calculated according to the size of the eyeball in the image. The system also can provide a default ratio relationship n between the eye size and the distance n between the eye and the screen, in which case, calibration can be cancelled. Note that when calculating the eye size, it is not good to calculate the area of the eyeball in an image because of the unfixed size of an opened eye; otherwise, errors are prone to occur in the eye area calculation. According to an embodiment of this invention, the eye size is represent by a relatively stable quantity, such as a linear distance between an inner canthus and an outer canthus in the case of a single eye (a left or right eye), and a distance between the centers of the two pupils (the pupil distance) in the case of two eyes. With reference to FIG. 5, in the process of calculating a coordinate of a line of sight on the computer screen mapped from a coordinate of a single eye in an image frame, a linear distance between an inner canthus and an outer canthus is employed as the eye size, namely, $$\alpha = \text{a horizontal distance 1+a horizontal distance 2+the diameter } D \text{ of the eyeball} \quad (9)$$

wherein:

the horizontal distance $1 = \sqrt{(X\text{min}-x\text{min})^2 + (Y1-y1)^2}$ the horizontal distance $2 = \sqrt{(X\text{max}-x\text{max})^2 + (Y2-y2)^2}$ the diameter $D$ of the eyeball=
$\sqrt{(x\text{min}-x\text{max})^2 + (y1-y2)^2}$ wherein
(X min, Y1) denotes a pixel on the orbit boundary having a minimal x coordinate;
(x min, y1) denotes a pixel on the eyeball boundary having a minimal x coordinate;
(X min, Y2) denotes a pixel on the orbit boundary having a maximal x coordinate;
(x max, y2) denotes a pixel on the eyeball boundary having a maximal x coordinate.

According to another embodiment of this invention, according to the eye size in the image frame and the coefficient n, setting the center distance of the both pupils of the user is α1, a perpendicular distance d between the eye and a plane in which the camera locates at that time can be calculated, $$n=a_1/d \tag{10}$$

When taking an eye image, if several people are present in an image frame, unwanted eye images can be removed according to conditions, such as the size of eye images, distances between eyes and a center position of the image frame.

According to the image recognition result of block S101, a center position coordinate $(X_t, Y_t)$ of the eye in the image frame is obtained, which is further mapped to a coordinate on the computer screen. Commonly, cameras are provided on the top middle of the screens of notebook computers, and image visual fields of different notebook computers only have ignorable differences in their relative position relationships with the eye. According to the horizontal and longitudinal coordinate position of the eye in the image frame and setting the height and width of the image frame as h and w respectively, an angle α and an angle β between the eye and the screen plane in the X direction and the Y direction can be obtained (constructing vertical lines to the X and Y axes from the position of the eye, the angles α and β are angles between the vertical lines and a plane in which the screen locates respectively).

$$\alpha=90-\arctan(Y_t-h/2)/d \tag{11}$$

$$\beta=90-\arctan(X_t-w/2)/d \tag{12}$$

A calibration step can be added for devices other than notebook computers to determine those two angles. According to the results of equations (1), (2) and (3), a relative position relationship of the eye in the three-dimensional coordinate system can be calculated:

$$X=d/\tan\alpha,\ Y=d/\tan\beta \tag{13}$$

Through color filtering, black biased and white biased images are found out respectively. The central black biased region is the pupil, and the surrounding white biased region is the white of the eye.

The line of sight is mapped to a position B $(X_1, Y_1)$ on the screen, a $X_1$ axis passing through a point $(0, Y_1)$ and parallel to the X axis, and a $Y_1$ axis passing through a point $(X_1, 0)$ and parallel to the Y axis are constructed on the XY plane of the screen.

According to the ratio of the width of the white of the eye on the left and right to the pupil, and the ratio of the width of the white of the eye above or below the pupil, an orientation of the pupil of the eye in the spatial coordinate system can be evaluated through looking up a table. According to an embodiment of this invention, perpendicular lines to the Y1 and X1 axes are constructed respectively from the position of the eyeball, which form angles $\alpha_1$ and $\beta_1$ with the plane in which the screen is located respectively. Assuming a user faces the camera and screen, with a connection line between his two eyes substantially parallel to the plane of the screen, the orientation of the pupil of an eye in the spatial coordinate system is represented with $\alpha_1$ and $\beta_1$.

According to the above results, a coordinate $B(X_1, Y_1)$ on the screen to which an eye is mapped is calculated with a space geometry method:

$$X_1=X-d/\tan\alpha_1,\ Y_1=Y-d/\tan\beta_1; \tag{14}$$

At block S104, it is determined whether the fourth coordinate is in the vicinity of a second coordinate. According to an embodiment of this invention, as to a single multi-touch point, it can be determined whether the distance between a coordinate to which an eye is mapped and a coordinate mapped from the single multi-touch point is less than a threshold (such as 30 pixels), if so, it is determined that the fourth coordinate is in the vicinity of the second coordinate. According to an embodiment of this invention, as to two multi-touch points, it can be determined whether the distance between a coordinate to which an eye is mapped and a connection line between the coordinates of the two multi-touch points is less than a threshold (such as 30 pixels), if so, it is determined that the fourth coordinate is in the vicinity of the second coordinate. According to an embodiment of this invention, as to three or more multi-touch points, first, it is determined whether a coordinate to which an eye is mapped is within a polygon constructed by connecting the coordinates mapped from the plurality of multi-touch points, if so, it is determined that the fourth coordinate is in the vicinity of the second coordinate; otherwise, it is further determined whether the distance between a coordinate mapped from an eye and a coordinate mapped from an arbitrary multi-touch point is less than a threshold (such as 30 pixels), if so, it is determined that the fourth coordinate is in the vicinity of the second coordinate.

At block S105, in response to a positive decision result, it is determined that the second coordinate is a multi-touch point. All multi-touch points in the image are recognized following blocks S101-105, and each of them is assigned with an ID to uniquely identify each multi-touch point, then the IDs and the second coordinates are sent to an operation system as parameters of a multi-touch event. The operation system further sends this event to a multi-touch application having registered to accept such an event. The multi-touch event may be a simple event, for example, positions of fingers touching at any time. The multi-touch application may analyze user actions according to changes in these positions, and then take corresponding processes. The multi-touch even also may be a complex event, for example, separating two fingers, converging fingers, etc. the multi-touch application can directly respond according to such events. In response to a negative decision, it is determined that the second coordinate is not a multi-touch point, and the finger recognized is overlooked.

According to an embodiment of this invention, an adjacent frame containing the image of the finger is further analyzed to recognize whether the adjacent frame contains multi-touch points, if so, it is determined that whether multi-touch point contained image sub-blocks of the present frame match those multi-touch point contained image sub-blocks of the adjacent frame. According to an embodiment of this invention, it can be determined whether a image sub-block of a present frame matches a image sub-block of an adjacent frame based on the distance between the positions of the multi-touch points contained in the image sub-blocks of the present frame and the adjacent frame, and the similarity of the images of those image sub-blocks. If the decision is positive, those multi-touch points contained in the adjacent frame are identified with those IDs of the present frame. The multi-touch application may analyze the motion trace of multi-touch points of a plurality of multi-touch events to determine user actions and take corresponding responses.

Figure 6:
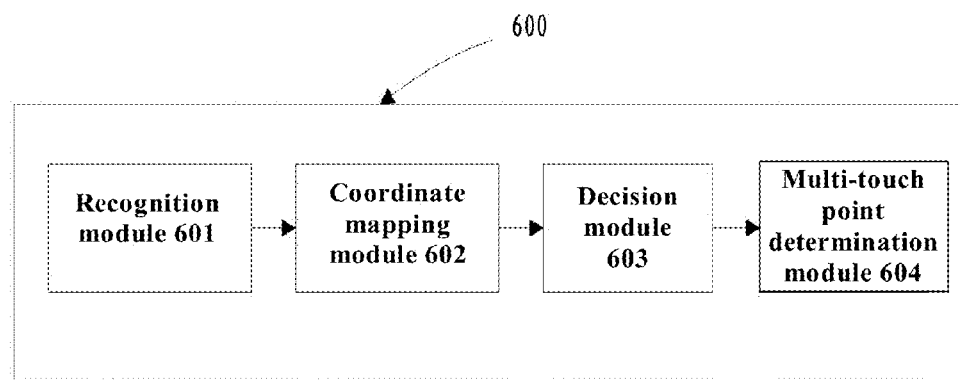
FIG. 6 shows a multi-touch apparatus according to embodiments of this invention.

Based on the same inventive concept, a multi-touch apparatus is provided in this invention. FIG. 6 shows a multi-touch apparatus according to an embodiment of this invention, which comprises: a recognition module 601 configured to, in response to at least one finger of a user pointing toward a computer screen, recognize an eye and at least one finger in an image frame taken by a camera; a coordinate mapping module 602 configured to map a first coordinate of the recognized finger in the image frame to a second coordinate of the finger on the computer screen; map a third coordinate of the recognized eye in the image frame to a fourth coordinate of the eye on the computer screen; a determination module 603 configured to determine whether the fourth coordinate is in the proximity of the second coordinate; a multi-touch point determination module 604 configured to, in response to a positive decision, determine the second coordinate as a multi-touch point.

The apparatus according to this invention further comprises an ID assignment module configured to assign a unique ID for a multi-touch point corresponding to the second coordinate; a parameter transmission module configured to send the ID and the second coordinate as parameters of a multi-touch event to an operating system.

In the apparatus according to this invention, wherein the ID assignment module is further configured to: in response to recognize that an adjacent image frame of the image frame contains a multi-touch point, determine whether a multi-touch point contained image sub-block in the adjacent image frame matches a multi-touch point contained image sub-block in that image frame; in response to a positive determining result, identify the multi-touch point contained in the adjacent image frame with the ID.

According to one embodiment of this invention, the fourth coordinate of the eye on the computer screen is calculated based on the following parameters: a third coordinate of the eye in the image frame, the size of the eye $\alpha$, a relationship coefficient n between the size of the eye $\alpha$ and a distance d between the eye and the computer screen, and the orientation of the pupil of the eye in the spatial coordinate system.

The apparatus according to this invention further comprises a classifier training module configured to select sampled finger and eye images as positive samples; select arbitrary images as negative samples; and train a classifier with the positive and negative samples.

In the apparatus according to this invention, the recognition module is further configured to partition a collected image frame to a plurality of image sub-blocks; and recognize a finger and an eye in the plurality of image sub-blocks with the classifier.

The apparatus according to this invention further comprises an image coordinate calculation module configured to extract the boundary of the recognized finger and the boundary of the recognized eyeball through an image boundary detection and extraction algorithm; calculate the first coordinate according to the number and coordinates of pixels on the boundary of the finger; calculate the third coordinate according to the number and coordinates of pixels on the boundary of the eyeball.

Figure 7:
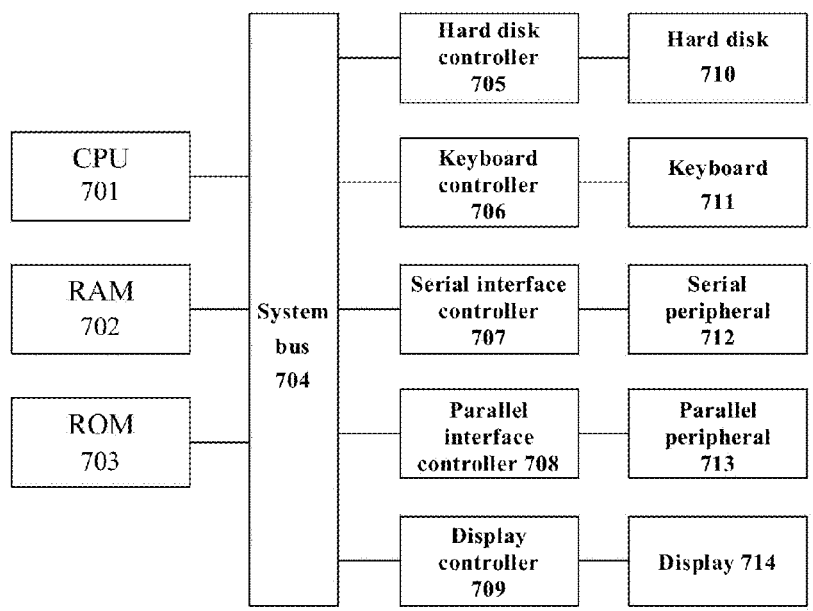
FIG. 7 schematically shows a structural block diagram of a computing device which can implement embodiments of this invention.

FIG. 7 schematically shows a structural block diagram of a computing device which is applicable to implement the embodiments of the present invention. As shown in FIG. 7, a computer system includes: CPU (Central Process Unit) 701, RAM (Random Access Memory) 702, ROM (Read Only Memory) 703, System Bus 704, Hard Drive Controller 705, Keyboard Controller 706, Serial Interface Controller 707, Parallel Interface Controller 708, Display Controller 709, Hard Drive 710, Keyboard 711, Serial Peripheral Equipment 712, Parallel Peripheral Equipment 713 and Display 714. Among above devices, CPU 701, RAM 702, ROM 703, Hard Drive Controller 705, Keyboard Controller 706, Serial Interface Controller 707, Parallel Interface Controller 708 and Display Controller 709 are coupled to the System Bus 704. Hard Drive 710 is coupled to Hard Drive Controller 705. Keyboard 711 is coupled to Keyboard Controller 706. Serial Peripheral Equipment 712 is coupled to Serial Interface Controller 707. Parallel Peripheral Equipment 713 is coupled to Parallel Interface Controller 708. And, Display 714 is coupled to Display Controller 709.

The function of each component in FIG. 7 is known in the field, and the structure illustrated in FIG. 7 is also conventional. This structure is not only applied in a personal computer, but also in a portable device, like Palm PC, PDA (Personal Digital Assistant) and mobile phone, etc. In various applications, for example, for realizing a user terminal containing the client module of the present invention or a server host computer containing the network application server of the present invention, some components can be added in the structure illustrated in FIG. 7, or some components in FIG. 7 can be omitted. The whole system shown in FIG. 7 is controlled by computer readable instructions generally stored in the hard disk 710 or stored in EPROM or in other non-volatile memory as software. The software can also be downloaded from network (not shown in the figure). It can also be stored in hard disk 710, or the software downloaded from network can also be loaded to RAM 702 and executed by CPU 701 to perform the function defined by the software.

Though the computer system described in FIG. 7 can support the technical scheme provided by the invention, said computer system is only exemplary of a computer system. The skilled in the art can understand that many other computer system designs can also realize the embodiments of the present invention.

Although FIG. 7 shows a general purpose computer, those skilled in the art may appreciate that this invention is also applicable to other portable terminal devices, such as mobile phones, audio players, etc.

Although exemplary embodiments of this invention have been described with reference to drawings, however, it is to be understood that the invention is not limited to the disclosed embodiments. On the contrary, the invention is intended to cover all modifications and equivalent arrangements included within the spirit and scope of the appended claims. The scope of the following claims is to be accorded the broadcast interpretation so as to encompass all such modifications and equivalent structures and functions.

It should be understood that at least some aspects of the present invention may alternatively be implemented as a program product. Programs defining functions of the present invention can be delivered to a data storage system or computer system via a variety of signal-bearing media, which include, without limitation, non-writable storage media (e.g. CD-ROM), writable storage media (e.g. floppy disk, hard disk drive, read/write CD-ROM, optical media), and communication media, such as computer and telephone networks including Ethernet. It should be understood, therefore, that such signal-bearing media, when carrying or encoding computer readable instructions that direct method functions of the present invention, represent alternative embodiments of the present invention. This invention can be realized in the form of hardware, software, firmware or any combination thereof. This invention can be realized in one computer system in a centralized manner, or in a distributed manner in which various components are distributed among several computer systems connected with each other. Any computer system or other apparatus suitable for carrying out the method described herein is applicable. Preferably, the present invention is implemented in a manner of a combination of computer software and general-purpose computer hardware, in this manner of implement, when the computer program being loaded and executed, the computer system is controlled to carry out the method of the invention, and constitute the apparatus of the invention.

Preferred embodiments of this invention have been described above for the purpose of illustration, which is not exhaustive, and it is not intended to limit this invention to the exactly disclosed forms. In view of the above teachings, many modifications and changes are possible. It is obvious for those skilled in the art that such modifications and changes are all covered in the scope of this invention which is defined by the appended claims.

The invention claimed is:

1. A multi-touch method, comprising:
in response to at least one finger of a user pointing toward a computer screen, recognizing an eye and at least one finger in an image frame taken by a camera; mapping a first coordinate of the recognized finger in the image frame to a second coordinate of the finger on the computer screen; mapping a third coordinate of the recognized eye in the image frame to a fourth coordinate of the eye on the computer screen; determining whether the fourth coordinate is in the proximity of the second coordinate; in response to a positive decision, determining the second coordinate as a multi-touch point; assigning a unique ID for a multi-touch point corresponding to the second coordinate; sending the ID and the second coordinate as parameters of a multi-touch event to an operating system; in response to recognizing that an adjacent image frame of the image frame contains a multi-touch point, determining whether a multi-touch point contained image sub-block in the adjacent image frame matches a multi-touch point contained image sub-block in the image frame; in response to a positive determining result, identifying the multi-touch point contained in the adjacent image frame with the ID.

2. A multi-touch method, comprising:
in response to at least one finger of a user pointing toward a computer screen, recognizing an eye and at least one finger in an image frame taken by a camera; mapping a first coordinate of the recognized finger in the image frame to a second coordinate of the finger on the computer screen; mapping a third coordinate of the recognized eye in the image frame to a fourth coordinate of the eye on the computer screen; determining whether the fourth coordinate is in the proximity of the second coordinate; and in response to a positive decision, determining the second coordinate as a multi-touch point; wherein the fourth coordinate of the eye on the computer screen is calculated based on the following parameters: a third coordinate of the eye in the image frame, the size ct of the eye, a relationship coefficient n between the size ct of the eye and a distance d between the eye and the computer screen, and the orientation of the pupil in the spatial coordinate system.

3. The method according to claim 2, further comprising:
selecting sampled finger and eye images as positive samples;
selecting arbitrary images as negative samples;
training a classifier with the positive and negative samples.

4. The method according to claim 3, wherein recognizing an eye and at least one finger in an image frame taken by a camera comprises:
partitioning a collected image frame to a plurality of image sub-blocks;
recognizing an eye and at least one finger in the plurality of image sub-blocks with the classifier.

5. The method according to claim 4, further comprising:
extracting the boundary of the recognized finger and the boundary of the recognized eyeball through an image boundary detection and extraction algorithm;
calculating the first coordinate according to the number and coordinates of pixels on the boundary of the finger;
calculating the third coordinate according to the number and coordinates of pixels on the boundary of the eyeball.

6. A multi-touch apparatus, comprising:
a recognition module, configured to, in response to at least one finger of a user pointing toward a computer screen, recognize an eye and at least one finger in an image frame taken by a camera; a coordinate mapping module, configured to map a first coordinate of the recognized finger in the image flame to a second coordinate of the finger on the computer screen; and map a third coordinate of the recognized eye in the image flame to a fourth coordinate of the eye on the computer screen; a determination module, configured to determine whether the fourth coordinate is in the proximity of the second coordinate; a multi-touch point determination module, configured to, in response to a positive decision, determine the second coordinate as a multi-touch point; an ID assignment module, configured to assign a unique ID for a multi-touch point corresponding to the second coordinate; and a parameter transmission module, configured to send the ID and the second coordinate as parameters of a multi-touch event to an operating system; wherein the ID assignment module is further configured to: in response to recognize that an adjacent image frame of the image frame contains a multi-touch point, determine whether a multi-touch point contained image sub-block in the adjacent image frame matches a multi-touch point contained image sub-block in that image frame; and in response to a positive determining result, identify the multi-touch point contained in the adjacent image frame with the ID.

7. A portable terminal device, comprising a multi-touch apparatus according to claim 6.

8. A multi-touch apparatus, comprising:
a recognition module, configured to, in response to at least one finger of a user pointing toward a computer screen, recognize an eye and at least one finger in an image frame taken by a camera; a coordinate mapping module, configured to map a first coordinate of the recognized finger in the image flame to a second coordinate of the finger on the computer screen; and map a third coordinate of the recognized eye in the image flame to a fourth coordinate of the eye on the computer screen; a determination module, configured to determine whether the fourth coordinate is in the proximity of the second coordinate; and a multi-touch point determination module, configured to, in response to a positive decision, determine the second coordinate as a multi-touch point; wherein the fourth coordinate of the eye on the computer screen is calculated based on the following parameters: a third coordinate of the eye in the image frame, the size ct of the eye, a relationship coefficient n between the size ct of the eye and a distance d between the eye and the computer screen, and the orientation of the pupil of the eye in the spatial coordinate system.

9. The apparatus according to claim 8, further comprising a classifier training module configured to:
select sampled finger and eye images as positive samples;
select arbitrary images as negative samples;
train a classifier with the positive and negative samples.

10. The apparatus according to claim 9, wherein the recognition module is further configured to:
partition a collected image frame to a plurality of image sub-blocks;

recognize an eye and at least one finger in the plurality of image sub-blocks with the classifier.

11. The apparatus according to claim 10, further comprising an image coordinate calculation module, configured to:
extract the boundary of the recognized finger and the boundary of the recognized eyeball through an image boundary detection and extraction algorithm;
calculate the first coordinate according to the number and coordinates of pixels on the boundary of the finger;
calculate the third coordinate according to the number and coordinates of pixels on the boundary of the eyeball.

* * * * *